(12) United States Patent
Lee

(10) Patent No.: US 9,668,612 B2
(45) Date of Patent: Jun. 6, 2017

(54) ROASTER

(71) Applicant: Hyun Woo Lee, Seoul (KR)

(72) Inventor: Hyun Woo Lee, Seoul (KR)

( * ) Notice: Subject to any disclaimer, the term of this patent is extended or adjusted under 35 U.S.C. 154(b) by 507 days.

(21) Appl. No.: 14/006,346

(22) PCT Filed: Nov. 12, 2012

(86) PCT No.: PCT/KR2012/009520
§ 371 (c)(1),
(2) Date: Sep. 20, 2013

(87) PCT Pub. No.: WO2014/073724
PCT Pub. Date: May 15, 2014

(65) Prior Publication Data
US 2014/0373728 A1     Dec. 25, 2014

(30) Foreign Application Priority Data

Nov. 6, 2012 (KR) ........................ 10-2012-0124934

(51) Int. Cl.
A47J 37/06     (2006.01)
A47J 37/00     (2006.01)
(Continued)

(52) U.S. Cl.
CPC ............. *A47J 37/043* (2013.01); *A23B 4/044* (2013.01); *A23B 4/048* (2013.01); *A47J 27/04* (2013.01); *A47J 37/0664* (2013.01); *A47J 37/0786* (2013.01); *A47J 37/0754* (2013.01); *A47J 2027/043* (2013.01)

(58) Field of Classification Search
CPC .... A23B 4/044; A23B 4/048; A47J 2027/043; A47J 27/04; A47J 37/043; A47J 37/0664; A47J 37/0754; A47J 37/0786

USPC ..... 99/349, 443 R, 330, 367, 368, 374, 375, 99/392; 126/25 R, 25 C, 242, 245, 41 R, 126/39 R; 110/171; 141/331–343, 86, 141/98; 122/390–392, 40; 134/104.2, 134/22.1, 104.4, 123, 169 A; 184/106; 296/38; 248/94
See application file for complete search history.

(56) References Cited

U.S. PATENT DOCUMENTS 6,880,546 B1 * 4/2005 Koncelik, Jr. ........ F24B 1/1915
                                                          126/242
2006/0068067 A1 * 3/2006 Zimmerman ............ A23L 1/01
                                                          426/281

FOREIGN PATENT DOCUMENTS

KR     1998-033711 A     7/1998
KR     1998033711 A *     7/1998
(Continued)

OTHER PUBLICATIONS

KR101093530_translation_v2.pdf; KR200347663_translation.pdf; KR98033711A_translation.pdf.*

*Primary Examiner* — Dana Ross
*Assistant Examiner* — Ket D Dang

(57) ABSTRACT

A food roasting apparatus. A main body has a heating chamber housing provided with a heating line, a rotating unit to rotate food, a water tank, and a falling substance guide for guiding oil falling from the food into the water tank. A steam control unit induces evaporated moisture to circulate in the heating chamber housing. A medicinal substance guide container disposed adjacent the steam control unit contains medicinal substances therein. An aroma of the medicinal substances permeates the food.

15 Claims, 18 Drawing Sheets

(51) Int. Cl.
 *A47J 37/04* (2006.01)
 *A23B 4/044* (2006.01)
 *A47J 27/04* (2006.01)
 *A23B 4/048* (2006.01)
 *A47J 37/07* (2006.01)

(56) References Cited

FOREIGN PATENT DOCUMENTS

| KR | 20-0179524 | Y1 | | 4/2000 |
| KR | 20-0347663 | Y1 | | 4/2004 |
| KR | 200347663 | Y1 | * | 4/2004 |
| KR | 10-1093530 | B1 | | 12/2011 |
| KR | 101093530 | B1 | * | 12/2011 |

* cited by examiner

ROASTER

This application claims foreign priority of Korean Patent Application No. 10-2012-0124934, filed on Nov. 6, 2012, which is incorporated by reference in its entirety into this application.

TECHNICAL FIELD

The present invention relates, in general, to food roasting apparatuses and, more particularly, to a food roasting apparatus which can roast meat, bulbous plants such as sweat potatoes, fish, pieces of pizza, etc. or cook them using a barbecue method.

BACKGROUND ART

Generally, the term "well-being" is used to describe a physically and psychologically healthy lifestyle. Recently, people prefer food having a beneficial effect on their health. For this, when cooking meat, fish, etc., medicinal substances may be put into meat or fish or green tea powder may be added to meat or fish before the foods are directly roasted by gas or charcoal fire or indirectly roasted by heat of a heated planar board such as a roasting pan on which the food is placed.

However, in the case where meat or fish is cooked by the above-mentioned method, oil flowing out of the food directly falls downwards into flames and makes soot. Even though a roasting pan is used, it is not easy to adjust heat so that the roasting pan may be easily overheated and the food may be burned. Furthermore, incomplete combustion at the initial burning stage or soot caused by oil coming out of the food may generate harmful substances, and the harmful substances may adhere to the food. In addition, medicinal substances that have been added to the food to improve the nutrition are also burned, whereby the effects of the medicinal substances are countered, or there may be no effect of the medicinal substances in the cooked food.

To solve a problem of food being burned or the generation of soot, a variety of food roasting apparatuses have been recently developed. Such food roasting apparatuses include a main body which has a heating chamber housing therein, and different kinds of heating means and devices which are installed in the main body to heat food.

Conventional food roasting apparatuses can reduce the time it takes to roast food and use convectional heat or far-infrared heat, thus evenly roasting outside and the inside of foods, and roasting the top and bottom of foods at the same time.

However, after such a food roasting apparatus is used for a long period of time, food dregs or oil is accumulated at the bottom of the heating chamber housing. These food dregs or oil are the main reason for contamination in the heating chamber housing. Furthermore, food dregs or oil that falls downwards while roasting food may rebound because of kinetic energy of the food dreg or oil that is falling downwards, thus contaminating the food which is being cooked.

Moreover, in conventional food roasting apparatuses, when it is desired to add medicinal substances to foods for making healthy food, a user must open the heating chamber housing and put medicinal substances thereinto while cooking, thus inconveniencing the user. The medicinal substance may be contaminated by food dregs or oil which is rebound during the cooking process.

REFERENCE CITED

1. Rotating barbecue roaster (Korean Utility Model Application No. 20-199-0026079)

2. Charcoal fire roaster (Korean Utility Model Application No. 20-2004-0000149)

DISCLOSURE

Technical Problem

Accordingly, the present invention has been made keeping in mind the above problems occurring in the prior art, and an object of the present invention is to provide a food roasting apparatus in which a medicinal substance container is provided in a heating chamber housing so that the taste and flavor of medicinal substances can permeate food that is being cooked, and which is configured such that the medicinal substance or food can be prevented from being contaminated by food dregs or oil while cooking.

Technical Solution

In order to accomplish the above object, the present invention provides a food roasting apparatus, including: a main body having a heating chamber housing provided with a heating line; a rotating unit provided in an upper end of the heating chamber housing, the rotating unit rotating a food to be cooked; a water tank provided in lower end of the heating chamber housing and having a reverse conical shape that is open on an upper end thereof, the water tank containing therein water that is used to wet-heat the food; a falling substance guide coupled to the water tank such that oil falling downwards from the food flows into the water tank, the falling substance guide having a conical shape that is open on upper and lower ends thereof; a steam control unit inducing evaporated moisture moving upwards through the open upper end of the falling substance guide to circulate in the heating chamber housing by means of convection; and a medicinal substance container disposed adjacent to the steam control unit, the medicinal substance container containing a medicinal substance therein and having a mesh structure so that aroma of the medicinal substance permeates the food while wet-heating the food.

Advantageous Effects

In a food roasting apparatus according to the present invention, food is cooked by a heating line provided in a heating chamber housing and, simultaneously, water stored in a water tank is heated by the heating line and steam generated from the water is used to cook food. Therefore, unlike food cooked by only the heating line, food cooked by the apparatus of the present invention can have a moist and soft texture. The generated steam reaches the food after passing through a medicinal substance container that is installed in the heating chamber housing. Therefore, the taste and aroma of the medicinal substances contained in the medicinal substance container permeates the food which is being cooked. As such, because the medicinal substance container is disposed in the heating chamber housing, steam containing aroma of medicinal substances can be continuously supplied to food while it is being cooked. Therefore, the present invention can avoid the conventional problem in which it is very inconvenient to open the heating chamber housing and add medicinal substances into the heating chamber housing while cooking.

Moreover, the food roasting apparatus of the present invention indirectly heats food or medicinal substances in a wet-heating fashion rather than directly heating them using fire such as charcoal fire, thus preventing the medicinal substances from being burned while cooking.

Furthermore, because the food roasting apparatus is provided with a falling substance guide, food dregs or oil which falls downwards from the food while cooking can slowly flow into a water tank, thus preventing the food or the medicinal substances from being contaminated.

BEST MODE

The present invention provides a food roasting apparatus, including: a main body which has a heating chamber housing provided with a heating line; a rotating unit which is provided in an upper end of the heating chamber housing which rotates food to be cooked; a water tank which is provided in lower end of the heating chamber housing, the water tank having a reverse conical shape that is open on an upper end thereof and containing therein water that is used to wet-heat the food; a falling substance guide which is coupled to the water tank such that oil falling downwards from the food flows into the water tank, the falling substance guide having a conical shape that is open on upper and lower ends thereof; a steam control unit which induces evaporated moisture moving upwards through the open upper end of the falling substance guide to circulate in the heating chamber housing by means of convection; and a medicinal substance container which is disposed adjacent to the steam control unit the medicinal substance container containing a medicinal substance therein and having a mesh structure so that aroma of the medicinal substance permeates the food while wet-heating the food.

The bounds of the present invention are not limited to the following embodiment, and those skilled in the art will appreciate that various modifications, additions and substitutions are possible, without departing from the scope and spirit of the invention as disclosed in the accompanying claims.

Hereinafter, an apparatus for roasting food according to the present invention will be described in detail with reference to FIGS. 1 through 16.

Figure 1:
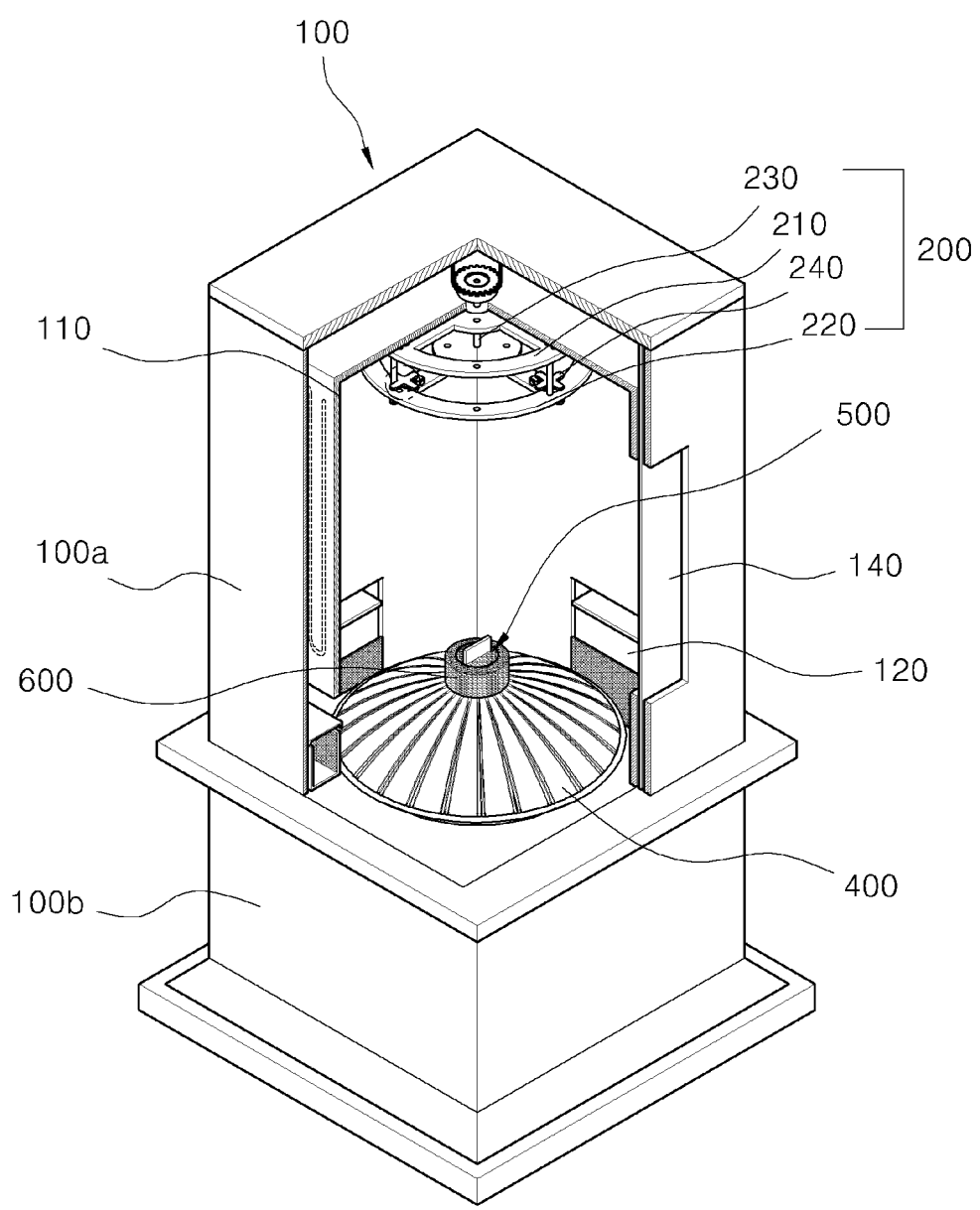
FIG. 1 is a perspective view illustrating an apparatus for roasting food, according to the present invention.
Figure 2:
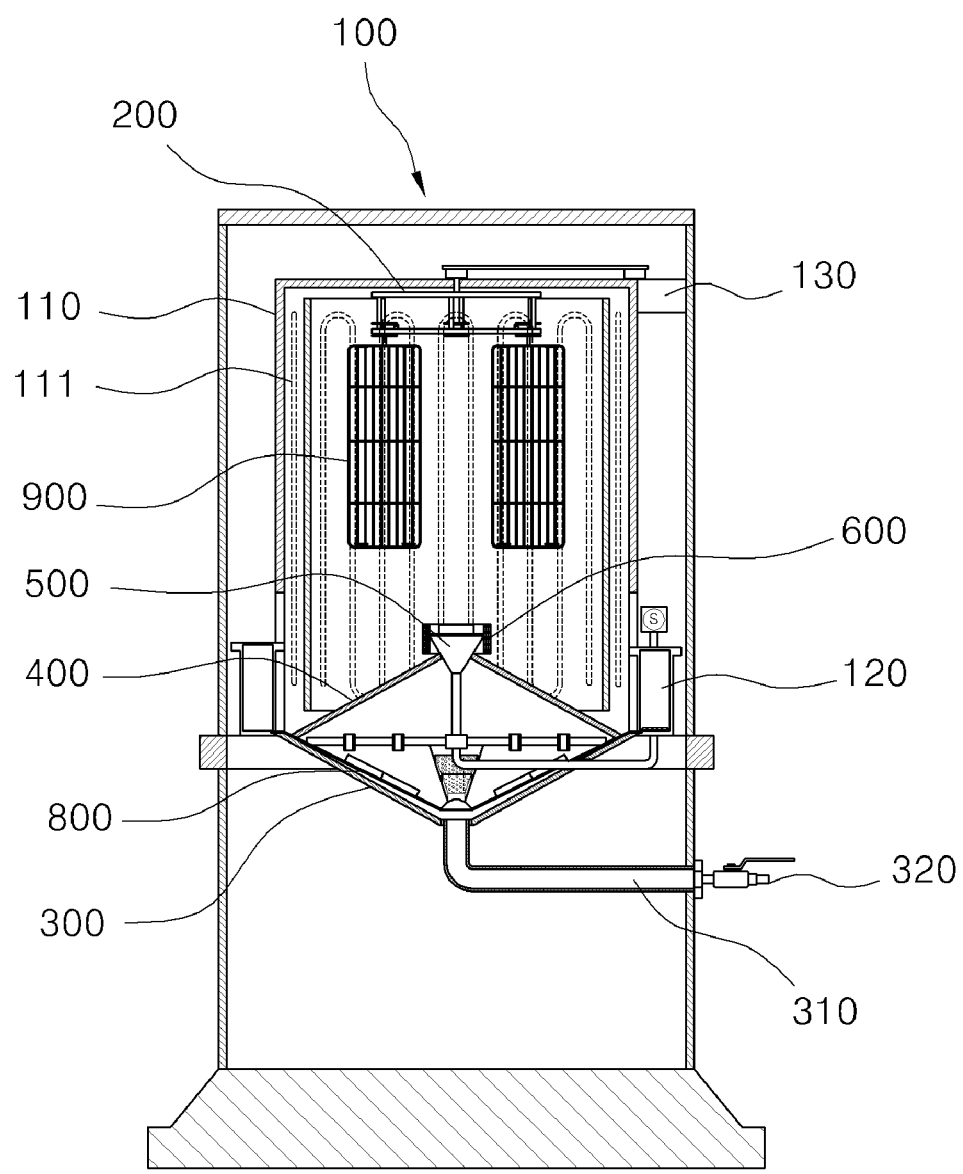
FIGS. 2 and 3 are sectional views showing the construction of a food roasting apparatus according to the present invention.

As shown in FIGS. 1 and 2, the food roasting apparatus according to the present invention includes: a main body 100 which has a heating chamber housing 110 provided with a heating line 111; a rotating unit 200 which is provided at an upper end in the heating chamber housing 110 so as to rotate food to be cooked; a water tank 300 which is installed at a lower end in the heating chamber housing 110 and contains water therein; a falling substance guide 400 which is coupled to an upper portion of the water tank 300; a steam control unit 500 which is provided on an upper portion of the falling substance guide 400; and a medicinal substance container 600 which is disposed adjacent to the steam control unit 500 and contains medicinal substances or the like therein.

The main body 100 includes the heating chamber housing 110 provided with the heating line 111. The main body 100 includes an upper main body 100a in which the heating chamber 110 is disposed, and a lower main body 100b which supports the upper main body 100a and enables the apparatus to be stably placed on the ground. A drive motor 130 which applies rotating force to the rotating unit 200 is installed at a predetermined position in an upper portion of the upper main body 100a. An opening door 140 is provided in a sidewall of the upper main body 100a so that food to be cooked can be inserted into the heating chamber housing 110 or cooked food can be removed from the heating chamber housing 110 through the opening door 140. Although it is not illustrated in the drawings, a duct and a suction unit may be provided in an upper end of the opening door 140 so that when the opening door 140 is opened, smoke generated in the heating chamber housing 110 can be removed via suction by the duct and the suction unit.

As stated above, the heating chamber housing 110 is provided with the heating line 111. Preferably, the heating line 111 is provided in an inner sidewall of the heating chamber housing 110 so as to cook food that is disposed in the heating chamber housing 110. In the present invention, food is cooked by heat generated from the heating line 111 rather than being directly heated by fire such as charcoal fire. Therefore, the heating temperature can be easily controlled so that food can be prevented from being burned.

Figure 3:
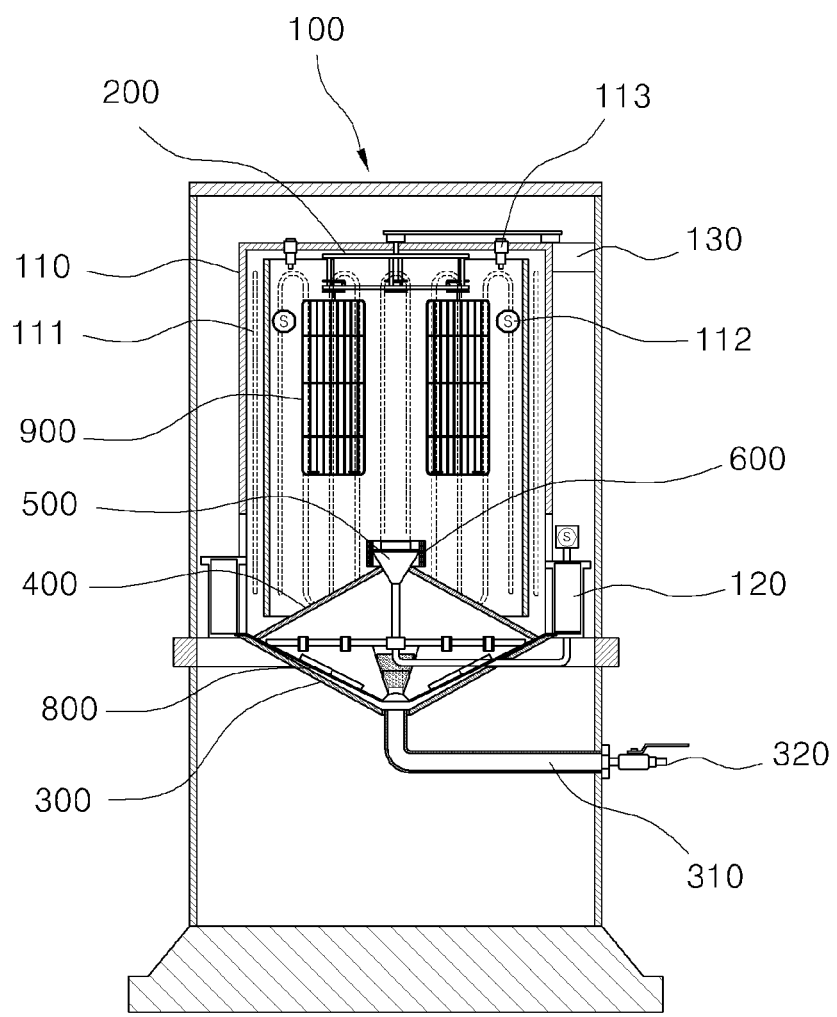

The heating chamber housing 110 is not limited to the structure in which it has the heating line 111. In other words, food can be cooked by a variety of heating means, for example, a means using gas, a heating lamp, etc. The position at which the heating line 111 is installed is also not limited to the inner sidewall of the heating chamber housing 110. A smoking chip storage unit 120 which includes wood pieces such as pine, rosales, oak, etc. is separately installed adjacent to the side of the heating chamber housing 110 so as to provide a smoking function. As shown in FIG. 3, a convection fan 112 is provided in the heating chamber housing 110 to evenly transfer heat in the heating chamber housing 110. A nozzle 113 is installed in the heating chamber housing 110 so as to supply moisture into the heating chamber housing 110 or supply water for cleaning thereinto.

The food roasting apparatus according to the present invention cooks food using wet heating so that the flavor and aroma of medicinal substances permeates the food, and the evaporated moisture and aroma of medicinal substances can be smoothly circulated by convection. In the present invention, although convection basically occurs in the heating chamber housing 110 by the steam control unit 500, the convection fan 112 is preferably installed such that the convection can be more actively driven.

The steam control unit 500 is installed at a lower portion in the heating chamber housing 110 and functions to transfer steam upwards. Preferably, the convection fan 112 is disposed at an upper portion in the heating chamber housing 110.

Furthermore, when it is required to clean the interior of the heating chamber housing 110 after food has been cooked in the heating chamber housing 110, the opening door 140 of the main body 100 must be opened, and the cleaning operation must be conducted through the opening door 140. If the opening door 140 is provided at one position in the sidewall of the main body 100, it is not easy to clean the interior of the heating chamber housing 110. Given this, it is preferable that the nozzle 113 be provided in the heating chamber housing 110 so as to spray water into the heating chamber housing 110. The nozzle 113 is preferably disposed in the heating chamber housing 110, and a plurality of nozzle 113 may be provided. After food has been cooked, foreign substances can be easily eliminated from the heating chamber housing 110 in such a way that the nozzles 113 spray water into the heating chamber housing 110. Furthermore, the nozzles 113 may be used in such a way that water is automatically or manually supplied into the heating chamber housing 110 during a cooking process so as to adjust the humidity in the heating chamber housing 110.

The rotating unit 200 is installed at a central portion of the upper portion in the heating chamber housing 110 so as to rotate food to be cooked. The rotating unit 200 includes an upper ring 210 and a lower ring 220 which are arranged parallel to each other. The upper ring 210 is fixed to the upper end of the heating chamber housing 110 so as not to be rotatable. A rotating shaft 230 passes through a central portion of the upper ring 210. The upper ring 210 and the lower ring 220 are not limited to circular shapes so long as the lower ring 220 can rotate in the heating chamber housing 110 without being impeded. Further, brackets 240 are provided on the lower ring 220 at positions spaced apart from each other in the circumferential direction at regular intervals. A food support unit 900 can be coupled to the lower ring 220 by each bracket 240.

As shown in FIGS. 1 through 5, the water tank 300 is installed in the lower portion of the heating chamber housing 110. Although it is preferable that the water tank 300 have a reverse conical shape to make it possible to store water therein, the shape thereof is not limited to this, and it can have any shape so long as it can contain a sufficient amount of water therein. Water that has been stored in the water tank 300 is heated by the heating line 111 of the heating chamber housing 110, whereby food that is disposed in the heating chamber housing 110 is wet-heated. Therefore, the food that is being cooked or the surface thereof is prevented from being dried.

Furthermore, a water flow pipe 310 is connected to a central portion of a lower end of the water tank 300 so that water can be supplied into the water tank 300 or drained therefrom through the water flow pipe 310. A valve 320 is provided on the water flow pipe 310 outside the main body 100 so as to adjust supply or discharge of water.

The falling substance guide 400 functions to prevent food dregs or oil, generated during a process of wet-heating food which is being rotated by the rotating unit 200 provided in the upper end of the heating chamber housing 110, from directly falling into the water tank 300. The falling substance guide 400 preferably has a conical shape which is open on upper and lower ends thereof, but the shape thereof is not limited to this.

As shown in FIGS. 1 through 5, the falling substance guide 400 is coupled to or placed on the upper end of the water tank 300. The falling substance guide 400 is open on the upper and lower ends thereof to allow steam generated by heating water which has been stored in the water tank 300 to pass through the falling substance guide 400 and enter the heating chamber housing 110. Furthermore, the falling substance guide 400 has a conical shape, so that food dregs or oil which falls from the food flows downwards along an inclined surface of the falling substance guide 400.

Figure 4:
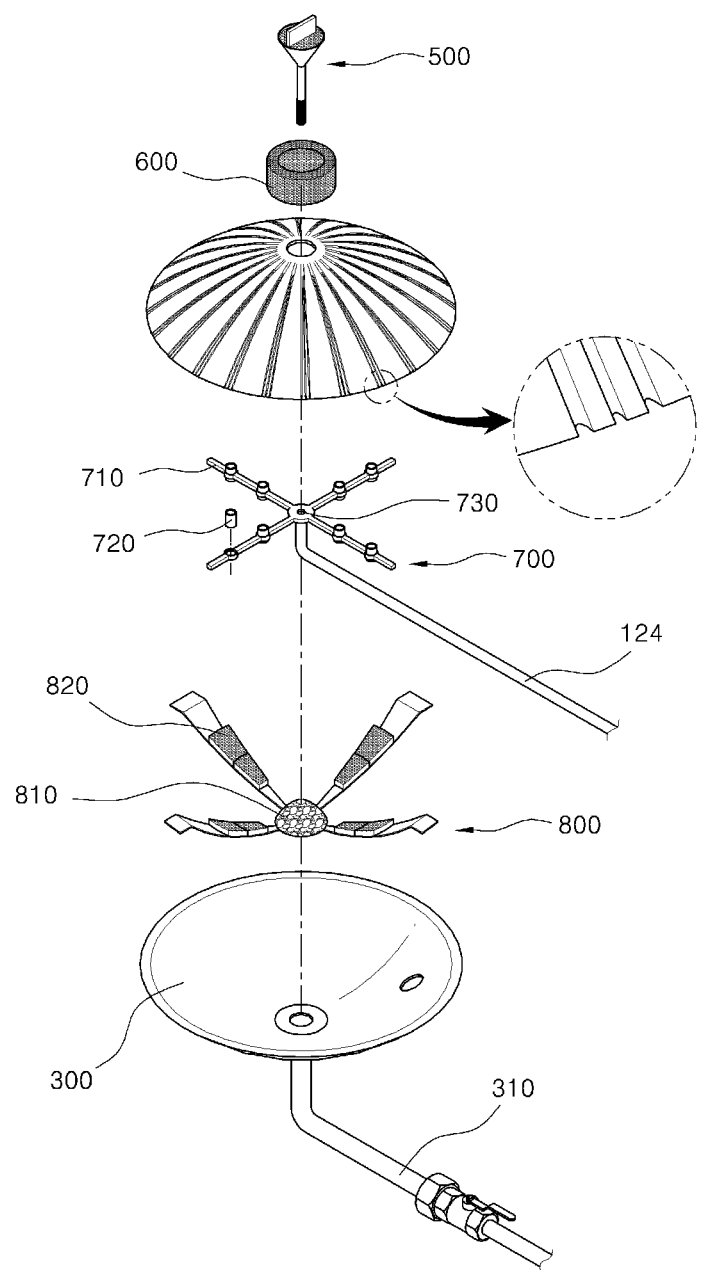
FIG. 4 is an exploded perspective view showing the construction of the food roasting apparatus according to the present invention.

It is preferable that the diameter of the falling substance guide 400 be less than that of the water tank 300. The reason for this is to enable food dregs or oil which flows downwards along the inclined surface to flow into the water tank 300. As shown in FIG. 4, grooves are formed along the outer inclined surface of the falling substance guide 400 so that the food dregs or oil can smoothly flow downwards along the grooves and enter the water tank 300.

As stated above, the falling substance guide 400 guides food dregs or oil that are generated from food supported by the food support unit 900 during the cooking process into the water tank 300. As a result, the food dregs or oil can flow into the water tank 300 rather than directly falling into the water tank 300, thus preventing water, food dregs or oil from spattering the food that is being cooked, thereby preventing the food from being contaminated.

Steam, which is generated by heating water stored in the water tank 300 using the heating line 111, is supplied into the heating chamber housing 110 through the open upper end of the falling substance guide 400. To evenly disperse steam in the heating chamber housing 110 for convection, the food roasting apparatus of the present invention includes the steam control unit 500.

As shown in FIGS. 1 through 6, the steam control unit 500 includes a support pipe 510 which is inserted into the open upper end of the falling substance guide 400, and a forced convection means 520 which is coupled to an upper end of the support pipe 510 and has a concave plate shape. Preferably, the diameter of the forced convection means 520 is equal to or greater than that of the open upper end of the falling substance guide 400.

Because the forced convection means 520 has a concave plate shape, steam that has moved to the upper portion of the falling substance guide 400 moves upwards along an inclined surface of the forced convection means 520 so that steam can be evenly dispersed in the heating chamber housing 110, whereby the entirety of food can be uniformly wet-heated rather than only a portion of the food being heated.

Furthermore, the forced convection means 520 which has a concave plate shape may contain medicinal herbs or the like therein. In this case, the forced convection means 520 further includes a cover 530 which has a mesh structure so as to prevent food dregs or oil from falling onto the medicinal herbs and allow aroma of the medicinal herbs to come out of the forced convection means 520. The cover 530 is coupled to an upper end of the forced convection means 520. A handle is provided on the cover 530 to allow a user to easily put medicinal herbs into the forced convection means 520 or remove it therefrom.

The medicinal herbs or the like that are contained in the forced convection means 520 are wet-heated by steam which moves upwards through the open upper end of the falling substance guide 400. Then, the aroma of medicinal herbs or the like is added to the steam. Therefore, while food is cooked by steam, the taste and aroma of the medicinal herbs that are contained in the forced convection means 520 permeate the food.

Depending on the individual tastes of a user, the kinds of medicinal herbs can be selected. As such, the present invention can make healthy food in such a way that medicinal substances of medicinal herbs permeate the food.

Furthermore, the aroma of the medicinal herbs which are contained in the forced convection means 520, along with smoke generated from the smoking chip storage unit 120 which will be explained later herein, is supplied into the heating chamber housing 110. This will be explained in detail later herein along with explanation of the smoking chip storage unit 120. In addition, an external thread 511 is formed on the support pipe 510. This will be explained in detail later herein along with explanation of a water exposure unit 700.

Figure 5:
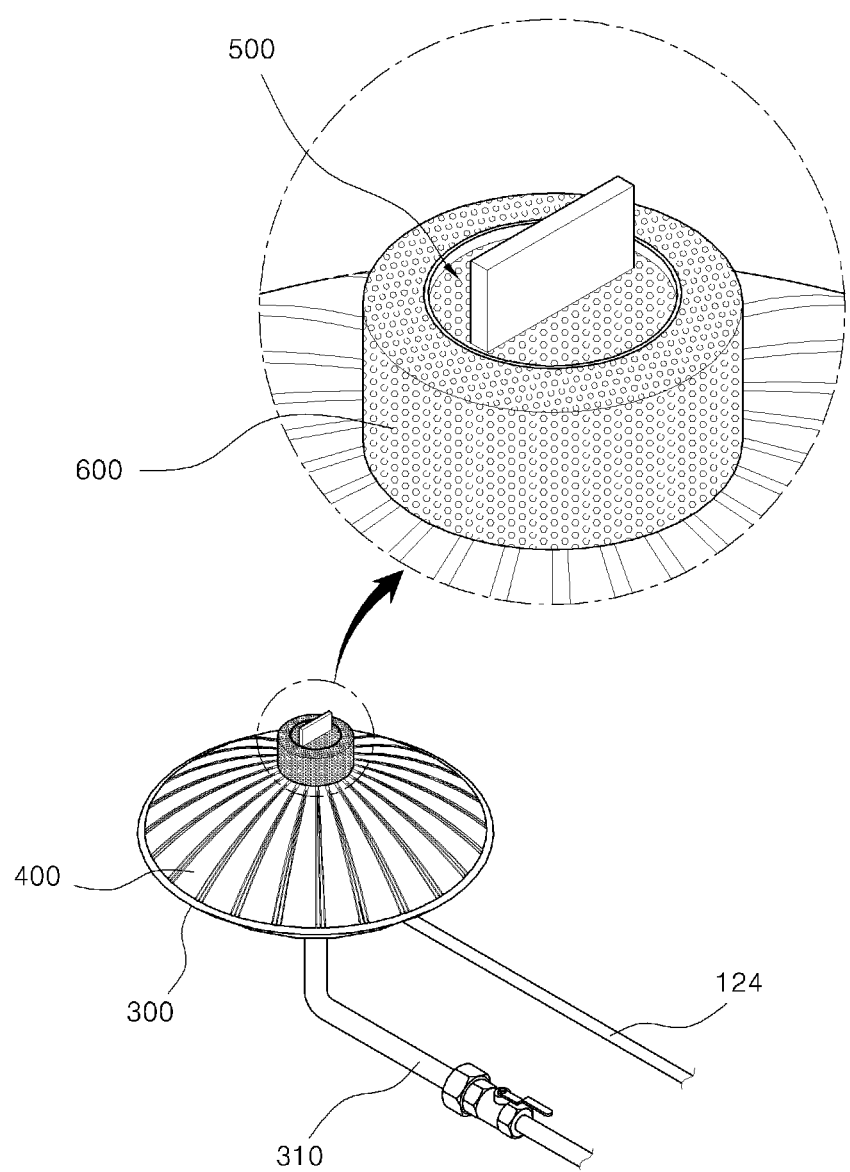
FIG. 5 is a view illustrating the construction of the assembled food roasting apparatus according to the present invention.
Figure 6:
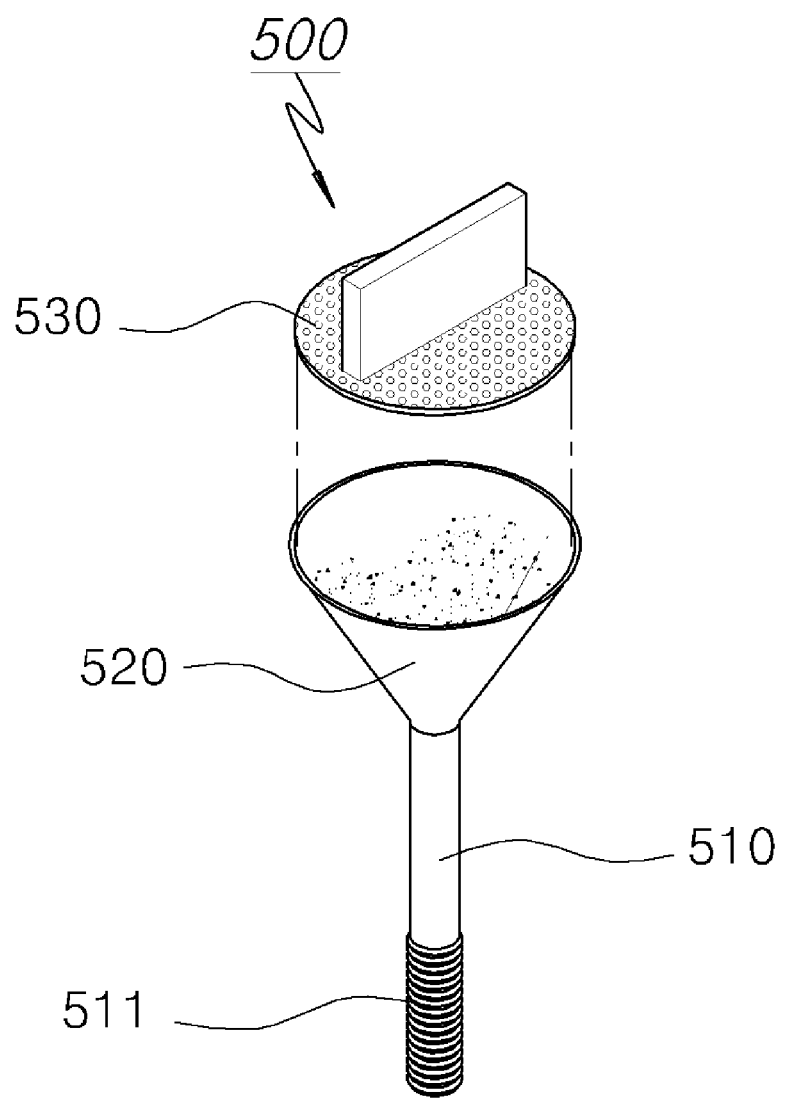
FIG. 6 is a view showing the construction of a steam control unit used in the food roasting apparatus according to the present invention.

As shown in FIGS. 4 and 5, the food roasting apparatus according to the present invention includes the medicinal substance container 600 which is provided to allow the taste and aroma of medicinal substances to permeate food which is being cooked. The medicinal substance container 600 is disposed adjacent to the steam control unit 500. Steam which is moving upwards through the open upper end of the falling substance guide 400 is supplied into the heating chamber housing 110 through the forced convection means 520. Given this, to add aroma of the medicinal substances to the steam before it permeates food, the medicinal substance container 600 is preferably provided in such a way that it encircles the forced convection means 520.

Since steam that is moving upwards along the inclined surface of the forced convection means 520 passes through the medicinal substance container 600 before entering the heating chamber housing 110, the aroma of medicinal substances or the like that are contained in the medicinal substance container 600 is added to evaporated moisture and then reaches the food. The medicinal substance container 600 can contain not only various kinds of medicinal herbs but also green tea powder, mugwort, fragrant grass, etc. depending on preference of the user.

Figure 7:
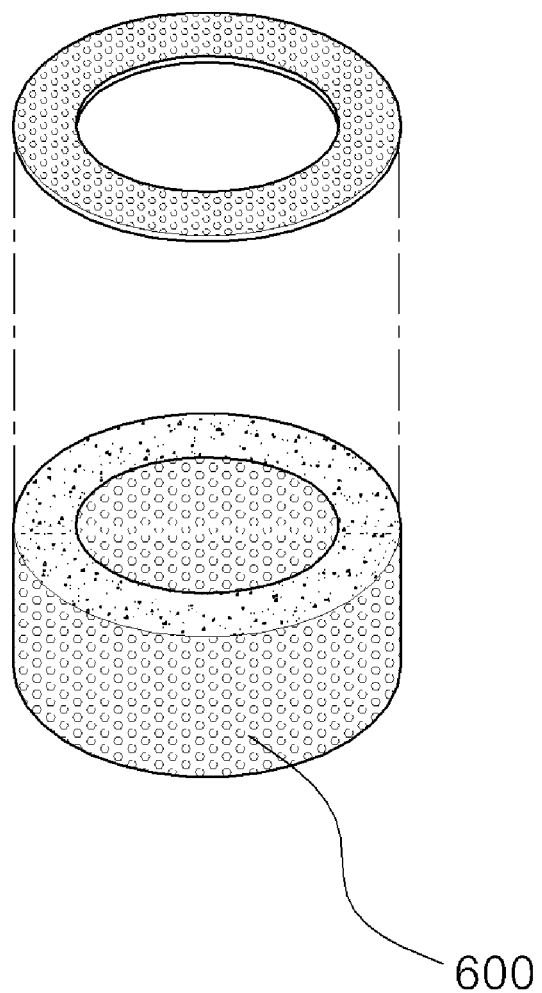
FIG. 7 is a view showing a medicinal substance container used in the food roasting apparatus according to the present invention.

Referring to FIG. 7, the medicinal substance container 600 is formed into a cylindrical shape having a predetermined thickness such that it encircles forced convection means 520. The shape of the medicinal substance container 600 is not limited to this. In other words, the medicinal substance container 600 can have various shapes. The medicinal substance container 600 includes a cover which is used to put medicinal substances or the like into the medicinal substance container 600 or remove them therefrom. The medicinal substance container 600 has a mesh structure so that moisture along with aroma of the medicinal substances can be evaporated.

Because the medicinal substance container 600 is disposed in the heating chamber housing 110, steam containing aroma of medicinal substances can be continuously supplied to food during the food cooking process, thus avoiding the conventional problem in which it is very inconvenient to open the heating chamber housing 110 to add medicinal substances into the heating chamber housing 110 while cooking. Moreover, the apparatus of the present invention indirectly heats food or medicinal substances in a wet-heating fashion rather than directly heating them using fire such as a charcoal fire, thus preventing the medicinal substances from being burned while cooking.

Meanwhile, if food dregs or oil which flow downwards along the falling substance guide 400 covers the surface of water in the water tank 300, it impedes the evaporation of water. To prevent this, the water exposure unit 700 is provided so that it exposes a surface of water. The water exposure unit 700 is disposed in the upper portion of the water tank 300 at a position at which the water exposure unit 700 touches the surface of water stored in the water tank 300 or a lower portion of the water exposure unit 700 is immersed in the water. Furthermore, the water exposure unit 700 preferably has a predetermined height such that even when the amount of stored water is reduced portions of the surface of the water can be exposed.

The water exposure unit 700 includes branch parts 710 which radially extend from a central point of the water tank 300, and water surface exposure pipes 720 which are installed in each branch part 710 at positions spaced apart from each other at regular intervals. Each water surface exposure pipe 720 is configured such that it is hollow and is open on opposite ends thereof. Even when the surface of the water stored in the water tank 300 is covered with food dregs or oil, because the lower end of the water surface exposure pipe 720 makes contact with the surface of the water or is immersed in the water, steam can be continuously generated.

The external thread 511 is formed on the lower end of the support pipe 510. As shown in FIG. 4, a through hole 730 is formed in a central portion of the water exposure unit 700 so that the support pipe 510 is threaded into the through hole 730. By virtue of this structure, the height of the steam control unit 500 can be adjusted by rotating the support pipe 510. Thereby, the rate at which steam containing aroma of the medicinal substances is supplied into the heating chamber housing 110 can be adjusted.

Figure 8A:
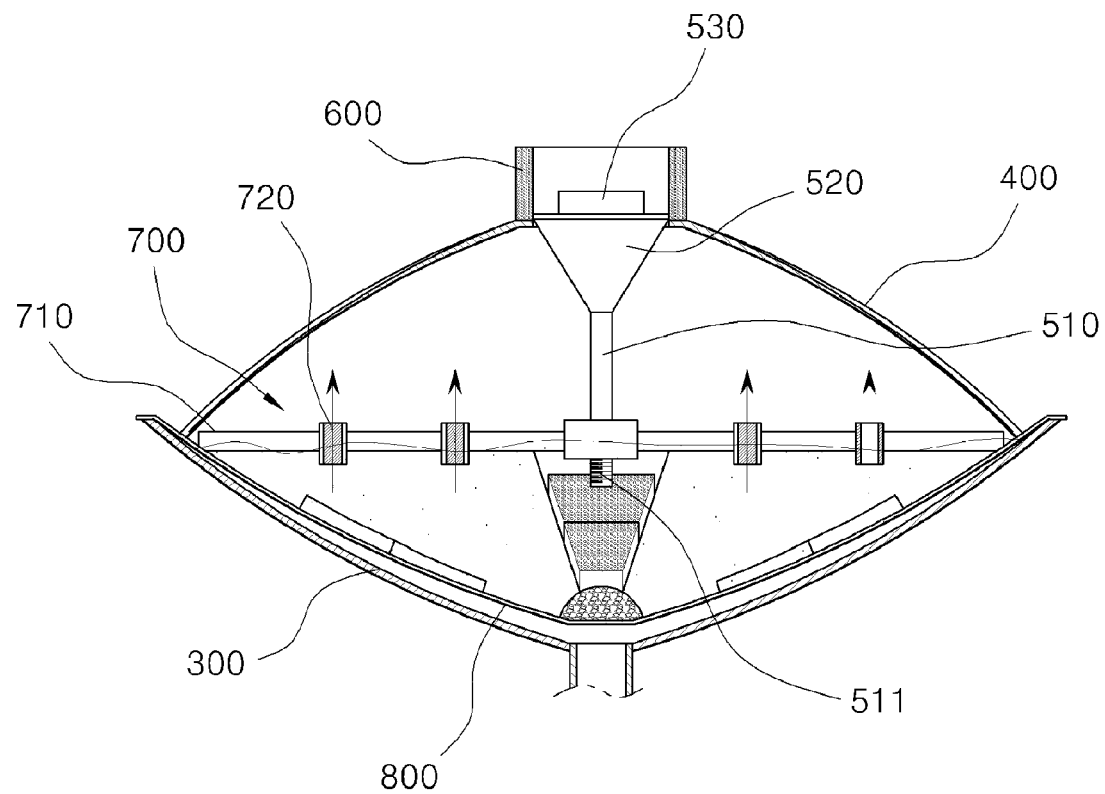
FIGS. 8a through 8c are views illustrating a process of controlling steam in the food roasting apparatus according to the present invention.

In detail, as shown in FIG. 8a, when the support pipe 510 is completely tightened into the through hole 730, the open upper end of the falling substance guide 400 is closed by the forced convection means 520 so that steam is prevented from being supplied into the heating chamber housing 110.

Figure 8B:
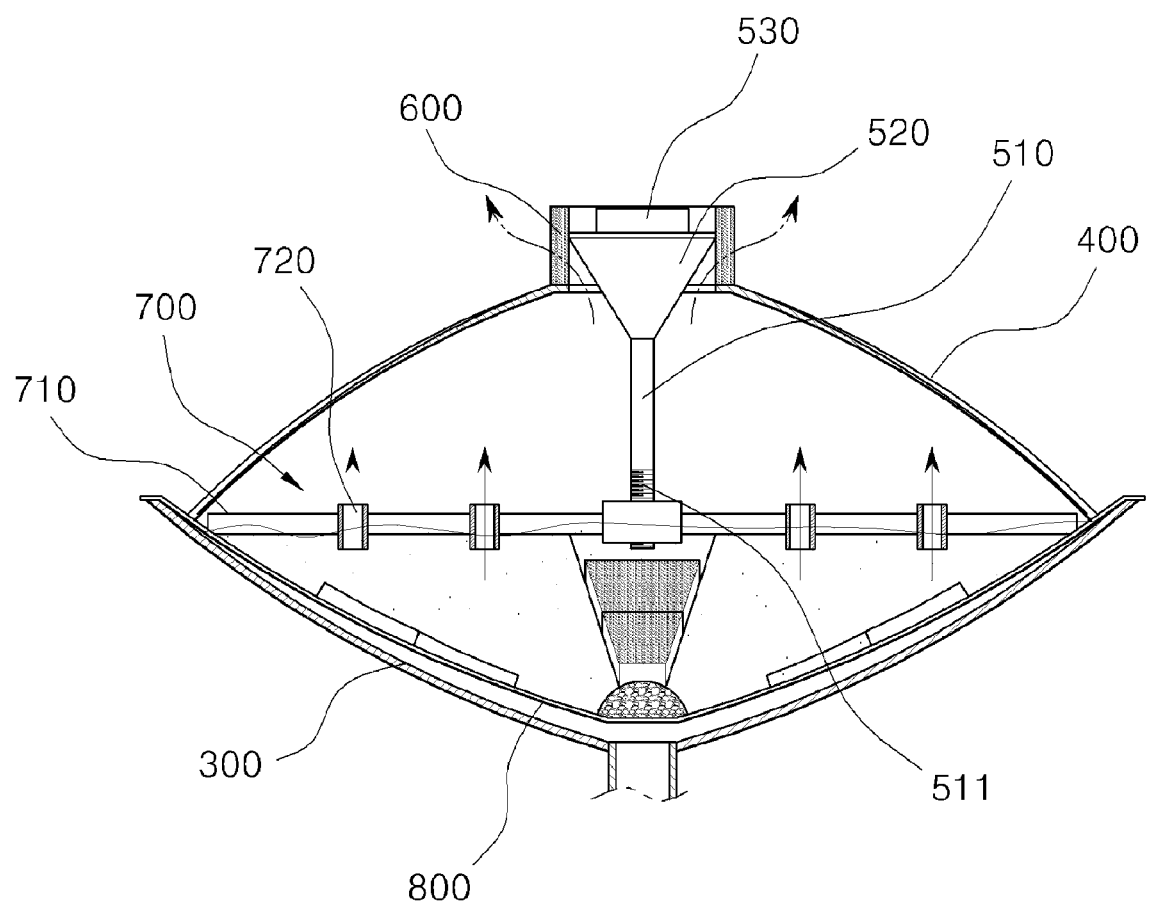
Figure 8C:
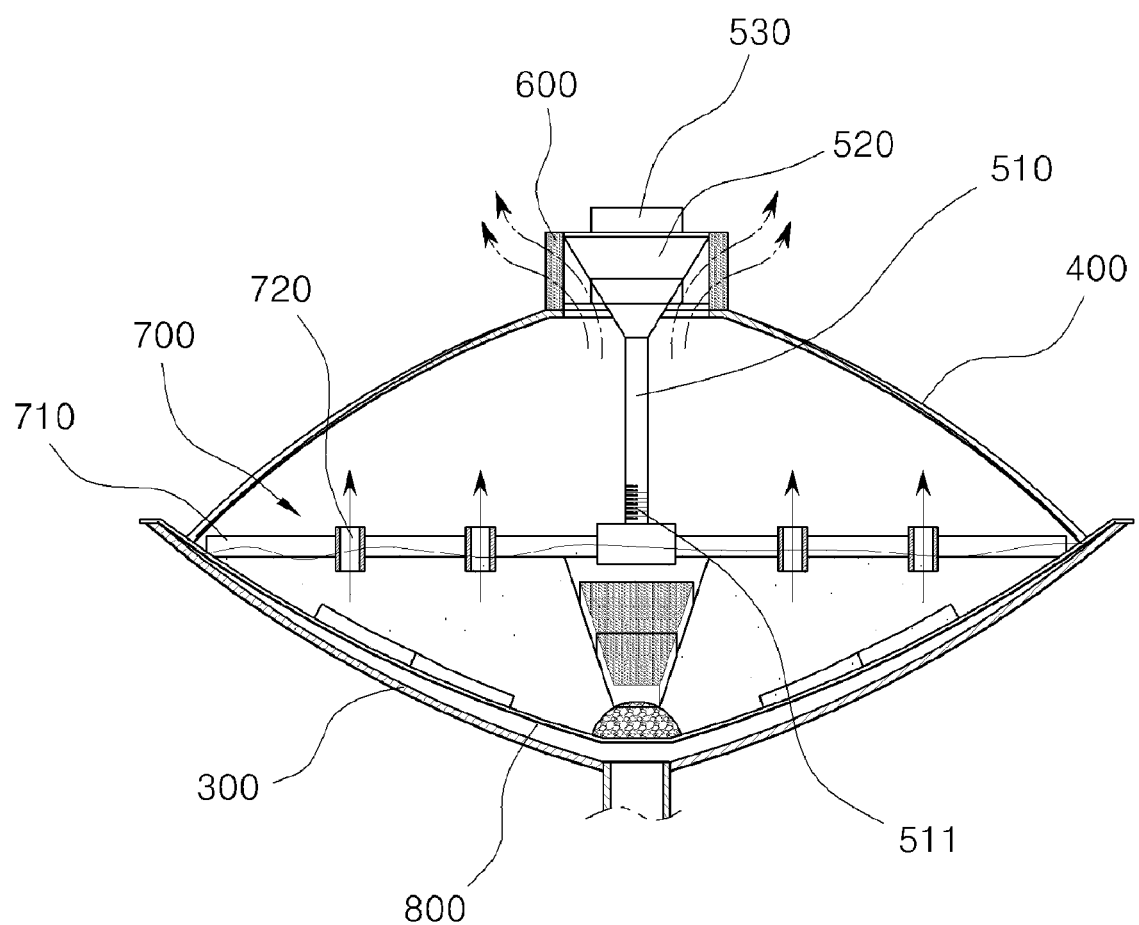

As shown in FIGS. 8b and 8c, when the support pipe 510 is rotated and loosened from the through hole 730, the steam control unit 500 is moved upwards. Then, the open upper end of the falling substance guide 400 is gradually opened so that steam generated from the water tank 300 can be supplied into the heating chamber housing 110. Depending on the degree with which the support pipe 510 is loosened from the through hole 730, the degree of opening is increased or reduced, and the rate at which steam is supplied into the heating chamber housing 110 can be adjusted.

To increase the intensity of the aroma of medicinal substances and make different kinds of aromas permeate food, the food roasting apparatus of the present invention may further include a immersion unit 800 which is installed in the water tank 300 separately from the medicinal substance container 600 in such a way that the immersion unit 800 is immersed in the water of the water tank 300.

The immersion unit 800 includes a barley stone 810 that emits far-infrared rays, and immersed medicinal substance containers 820 which have mesh structures and are provided on branch parts that radially extend from the barley stone 810. As shown in FIG. 4, the barley stone 810 may have a conical shape. Jade or germanium may be selectively used as the barley stone 810, but the present invention is not limited to this structure. The barley stone 810 functions to adsorb and decompose substances such as various kinds of heavy metals which are harmful to the health, thus sterilizing the water contained in the water tank 300.

Furthermore, in the case where the barley stone 810 is provided in water stored in the water tank 300, when steam generated from the water is applied to food such as fish or meat, a fishy smell from the fish or bloody smell from the meat can be eliminated. The scope of the meaning of the barley stone 810 is not limited to its terminology. For instance, material such as jade that can emit far-infrared rays can substitute for the barley stone 810.

Figure 9:
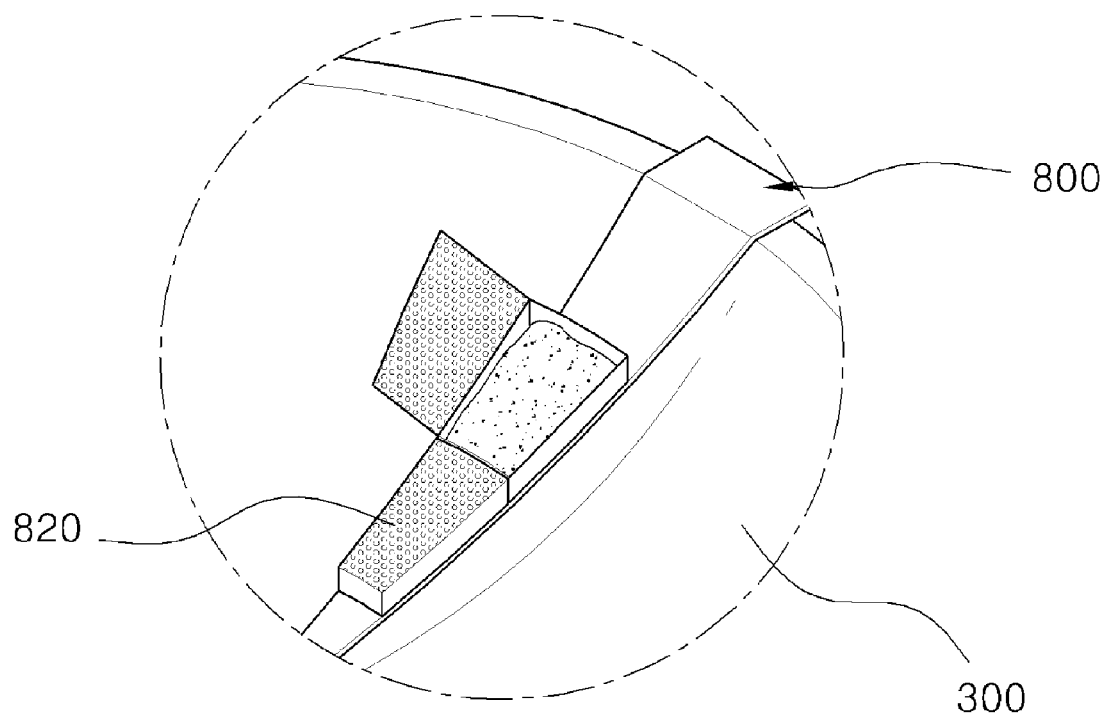
FIG. 9 is a view showing an immersion unit used in the food roasting apparatus according to the present invention.

The water flow pipe 310 through which water is supplied into or drained from the water tank 300 is connected to the central portion of the lower end of the water tank 300. Therefore, the immersion unit 800 must be disposed such that it does not close the water flow pipe 310. For this, as shown in FIGS. 4 and 9, the branch parts of the immersion unit 800 may be configured such that the upper ends of the branch parts are caught by the upper end of the water tank 300. However, this structure is only one example of the installation of the immersion unit 800, and the present invention is not limited to this structure.

The kinds of medicinal substances which are provided in the immersed medicinal substance containers 820 may be the same as those of the medicinal substances contained in the medicinal substance containers 600 so as to enhance the intensity of aroma of medicinal substances. Alternatively, the kinds of medicinal substances provided in the immersed medicinal substance containers 820 may differ from those of the medicinal substances contained in the medicinal substance containers 600 so that aroma and taste of more various kinds of medicinal substances can be applied to food which is being cooked.

As stated above, the smoking chip storage unit 120 which stores smoking chips therein is provided in the heating chamber housing 110. The smoking chip storage unit 120 functions to supply smoke into the heating chamber housing 110 and is disposed adjacent not only to the sidewall of the heating chamber housing 110 but also to the interior of the heating chamber housing 110.

Figure 10:
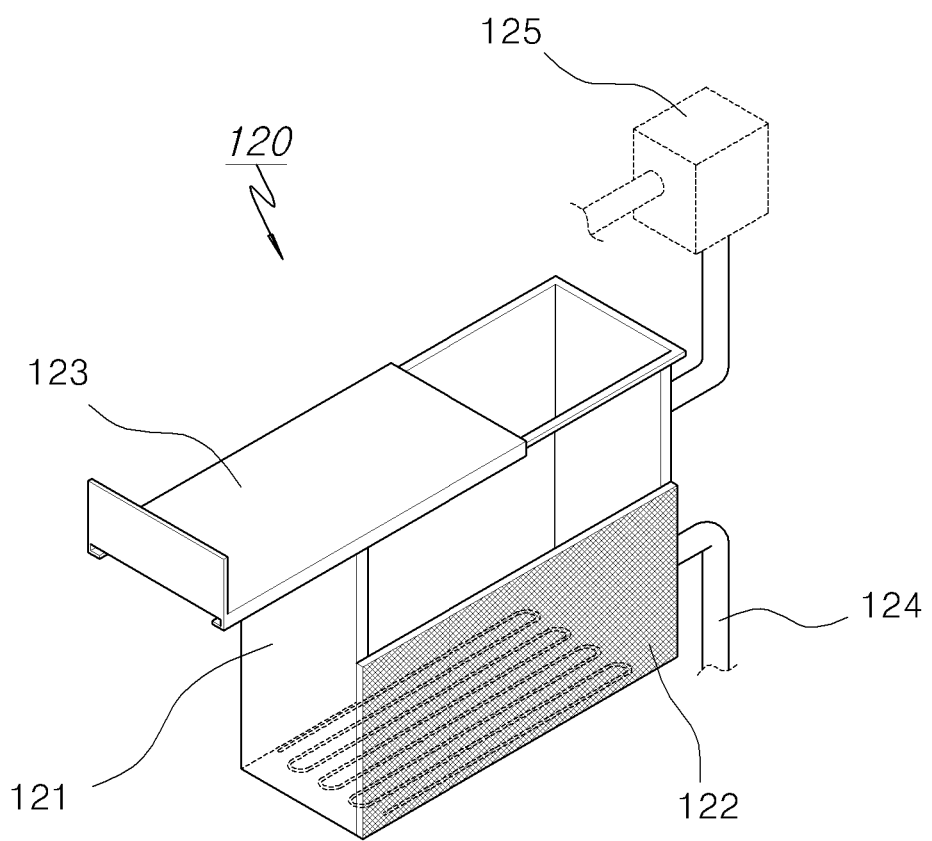
FIG. 10 is a view showing a smoking chip storage unit used in the food roasting apparatus according to the present invention.

As shown in FIG. 10, the smoking chip storage unit 120 includes a hexahedral body 121 which is open on an upper end and a side surface which faces the interior of the heating chamber housing 110, a mesh net 122 which covers the side surface of the hexahedral body 121 that faces the interior of the heating chamber housing 110 such that smoke is supplied into the heating chamber housing 110 through the mesh net 122, and an upper cover 123 which is coupled to the hexahedral body 121 in a sliding manner so as to openably cover the open upper end of the hexahedral body 121 and allow smoking chips to be supplied into or removed from the hexahedral body 121 through the open upper end of the hexahedral body 121.

Smoking chips are disposed in the smoking chip storage unit 120. The heating line 111 provided in the heating chamber housing 110 heats the smoking chips, thus generating smoke from the smoking chips. The smoke generated from the smoking chips is supplied into the heating chamber housing 110 through the mesh net 122 and reaches the food to apply a flavor stimulating a user's appetite and enhancing the taste of the food.

Figure 11:
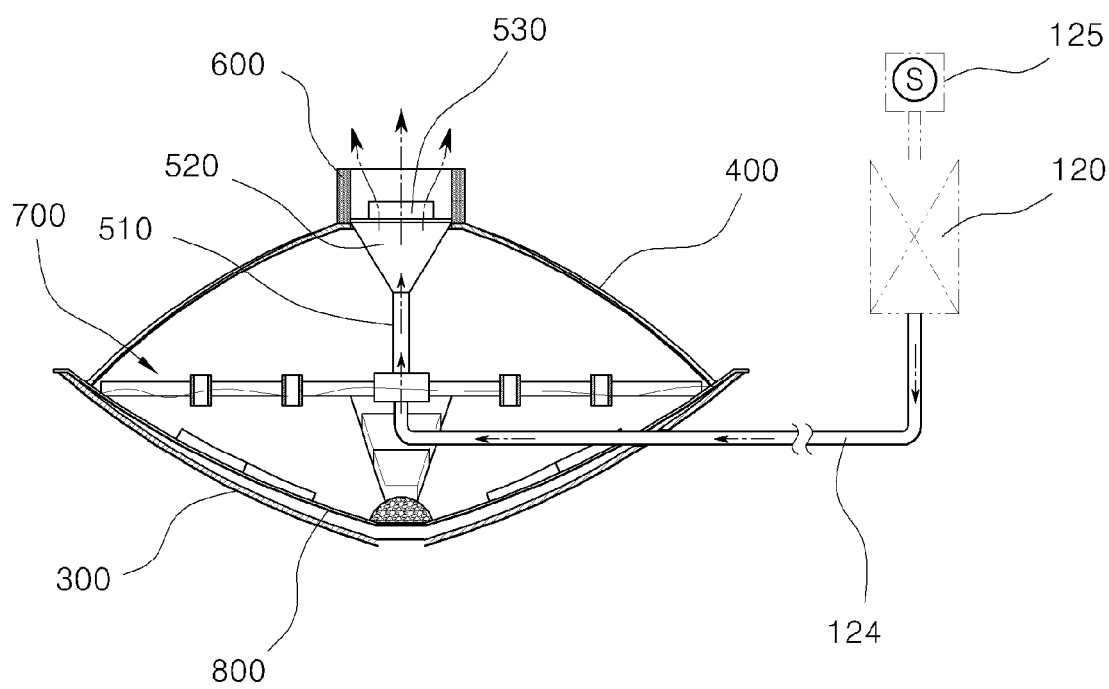
FIG. 11 is a view showing a process in which smoke comes out of the smoking chip storage unit used in the food roasting apparatus according to the present invention.

As shown in FIG. 11, the smoking chip storage unit 120 further includes a smoke pipe 124 which connects the smoking chip storage unit 120 to the support pipe 510. Smoke generated from the smoking chips is supplied into the heating chamber housing 110 through the support pipe 510. The smoking chip storage unit 120 includes a smoke fan 125 which makes it easy to supply smoke into the heating chamber housing 110 through the smoke pipe 124, and a heating line which is provided in the bottom of the hexahedral body 121 to heat the smoking chips more effectively.

Figure 12:
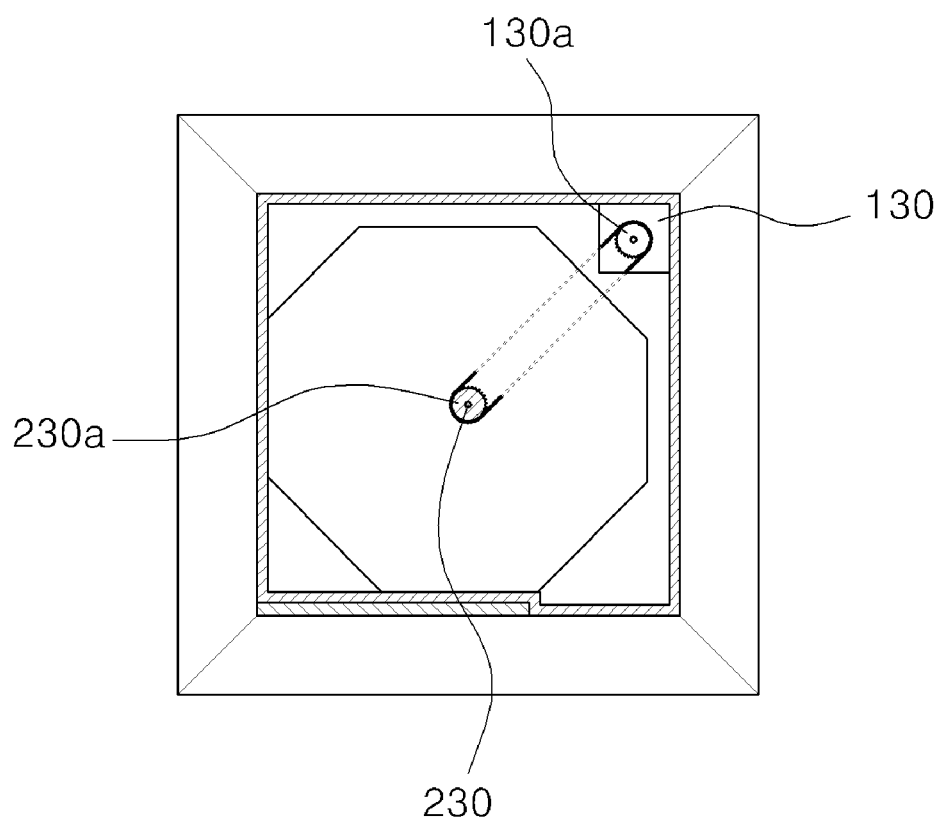
FIG. 12 is a view illustrating a structure for connecting a rotating unit to a drive motor in the food roasting apparatus according to the present invention.

The rotating unit 200 of the food roasting apparatus according to the present invention is rotated by the drive motor 130. As shown in FIG. 12, saw-toothed gears 130a and 230a are respectively coupled to the rotating unit 200 and the drive motor 130. The gears 130a and 230a are connected to each other by a chain. When the drive motor 130 is operated, the gear 130a connected to the drive motor 130 is rotated, whereby the chain is rotated. Then, the gear 230a connected to the rotating unit 200 is rotated by the rotation of the chain. Thereby, the rotating shaft 230 is rotated.

As described above, the rotating unit 200 includes the upper ring 210 and the lower ring 220. The upper ring 210 is fixed to the top of the heating chamber housing 110 so as not to be rotatable. The lower ring 220 is coupled to the rotating shaft 230 so that the lower ring 220 is rotated by rotation of the rotating shaft 230.

Figure 13:
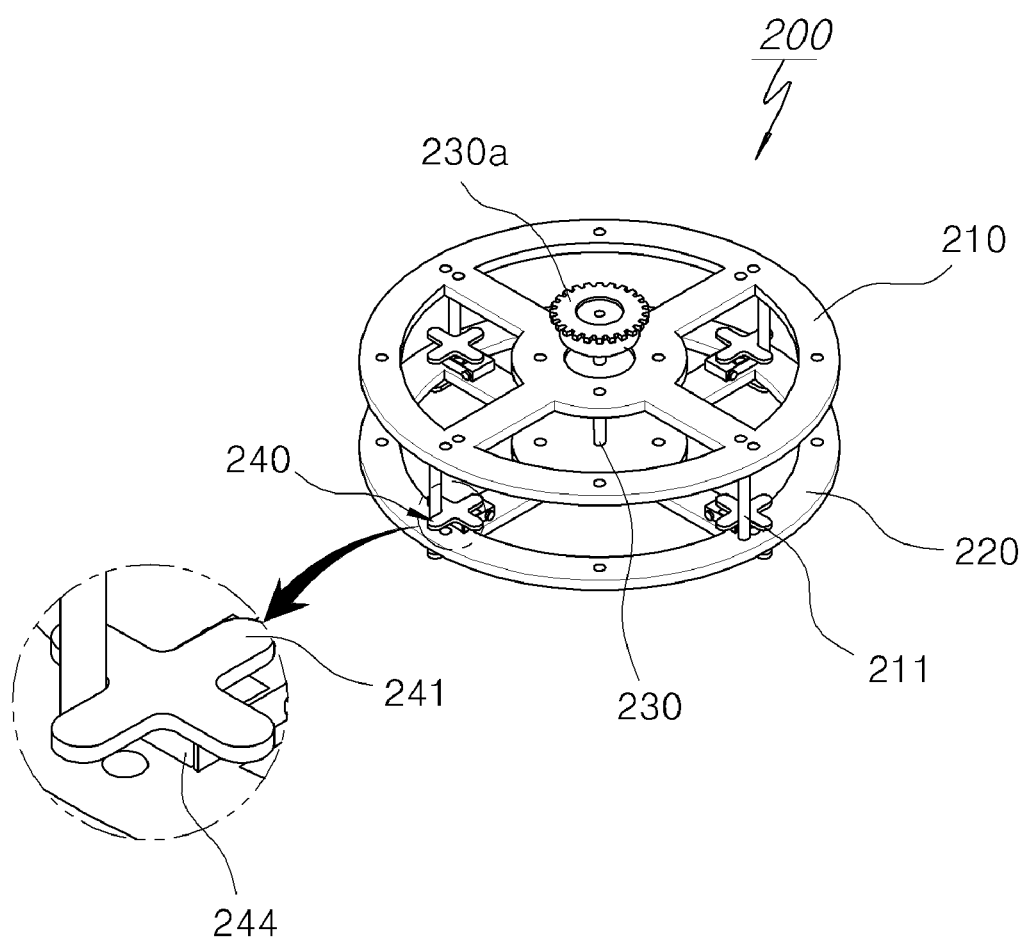
FIG. 13 is a perspective view showing the construction of the rotating unit used in the food roasting apparatus according to the present invention.
Figure 14:
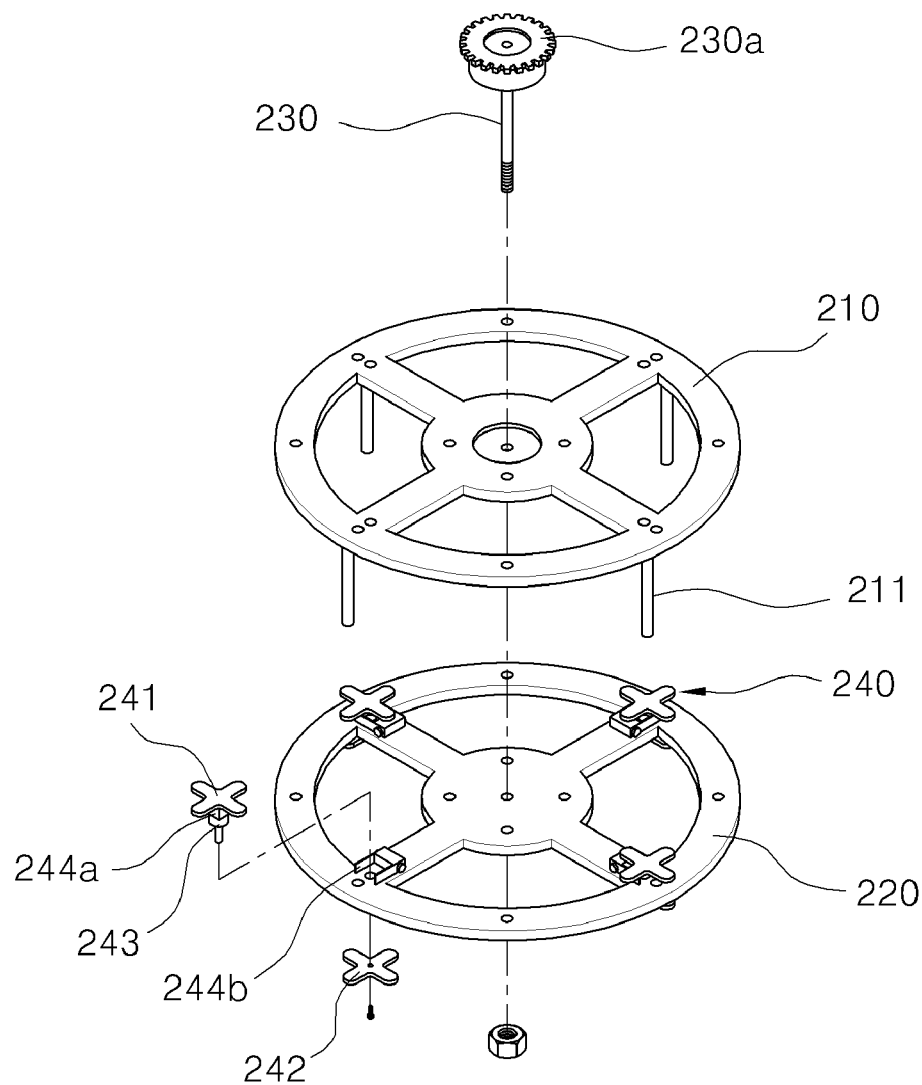
FIG. 14 is an exploded perspective view showing the construction of the rotating unit used in the food roasting apparatus according to the present invention.

As shown in FIGS. 13 and 14, the rotating unit 200 further includes a bracket rotating means 211 which protrudes from the upper ring 210 towards the lower ring 220, and the brackets 240 which are arranged along the circumference of the lower ring 220. Each food support unit 900 is removably coupled to the corresponding bracket 240.

Each bracket 240 includes an upper bracket 241 which is disposed above the lower ring 220, a lower bracket 242 which is disposed below the lower ring 220, a bracket rotating shaft 243 which connects the upper bracket 241 to the lower bracket 242 so that the upper and lower brackets 241 and 242 can be rotated in conjunction with each other, and a rotation limiting means 244 which is provided between the upper bracket 241 and the lower ring 220. The bracket 240 is caught and rotated by the bracket rotating means 211. Thereby, the food support unit 900 that is coupled to the bracket 240 is rotated. As a result, food that is fastened to the food support unit 900 is rotated and evenly wet-heated.

As shown in FIG. 14, the rotation limiting means 244 includes a rotational block 244a which is coupled to the bracket rotating shaft 243 and has a rounded rectangular cross-section, and an elastic plate 244b which makes close contact with a planar surface of the rotational block 244a so that rotation of the rotational block 244a can be interrupted.

With regard to the operation of the rotation limiting means 244, when the lower ring 220 is rotated, each bracket 240 collides with the bracket rotating means 211 and is thus rotated by it. Here, the bracket 240 rotates by about 90°, and the elastic plate 244b is bent by the rotational block 244a which is being rotated.

When the rotational block 244a rotates by about 90°, the elastic plate 244b comes into close contact with the planar surface of the rotational block 244a. The bracket 240 is no longer rotated unless the bracket 240 collides again with the bracket rotating means 211.

Figure 15:
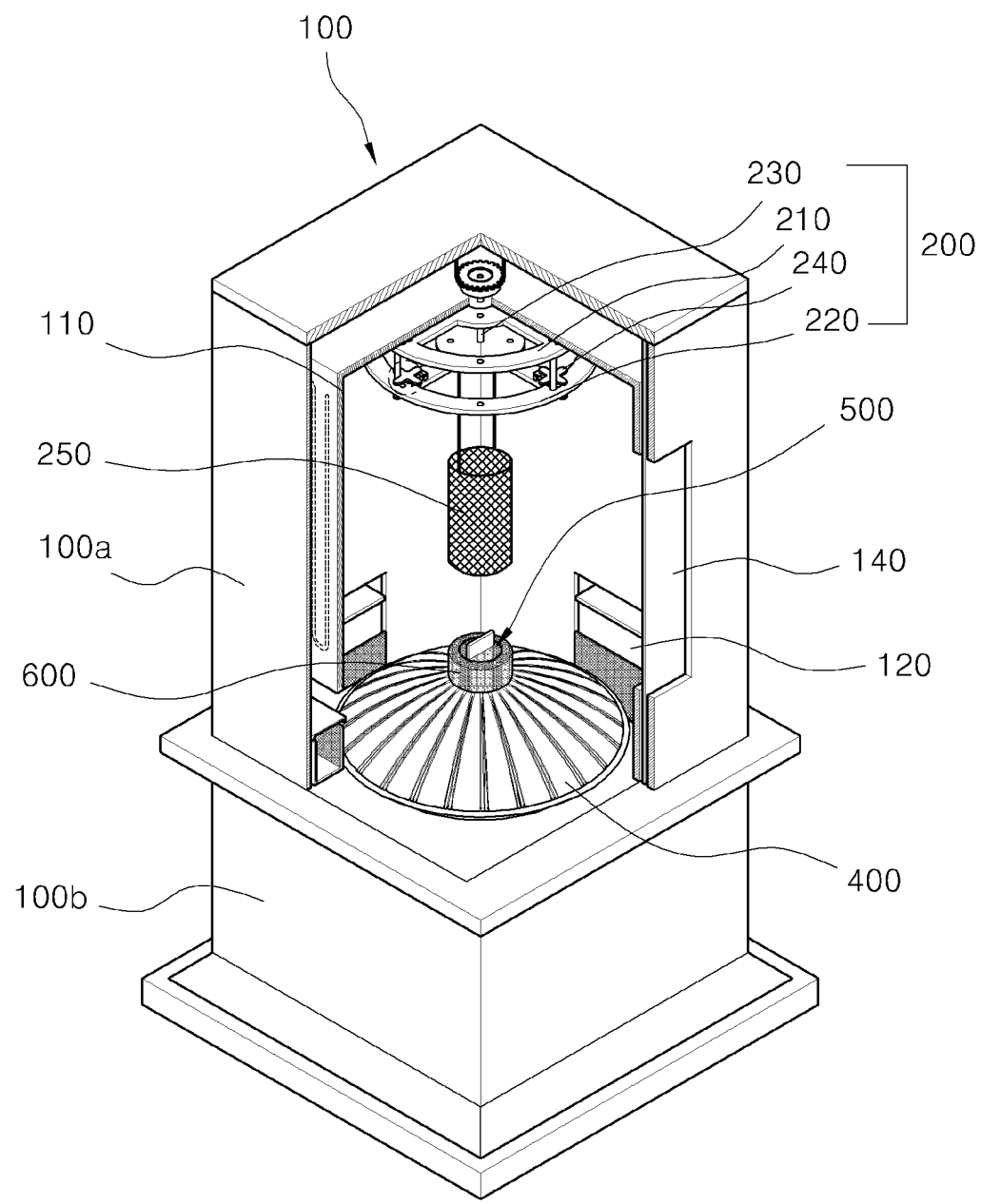
FIG. 15 is a view illustrating a charcoal bucket installed in the food roasting apparatus according to the present invention.

As shown in FIG. 15, a charcoal bucket 250 may be coupled to the rotating unit 200. It is preferable that the charcoal bucket 250 be connected to a central portion of the lower ring 220 by a wire or the like. The charcoal bucket 250 has a mesh structure and stores charcoal therein. The stored charcoal is heated by the heating line 111 provided in the heating chamber housing 110. Smoke generated from the charcoal comes out of the charcoal bucket 250 and reaches the food.

By virtue of installation of the charcoal bucket 250 in the heating chamber housing 110, various disagreeable smells which may be generated while cooking meat or fish can be eliminated, and the characteristic charcoal flavor can permeate the food. Furthermore, even after the heating operation of the heating line 111 is interrupted, the charcoal stored in the charcoal bucket 250 is maintained at a predetermined temperature. Therefore, the temperature in the heating chamber housing 110 can be maintained within a predetermined range for a predetermined time, thereby preventing the temperature of the cooked food from being rapidly reduced.

Figure 16:
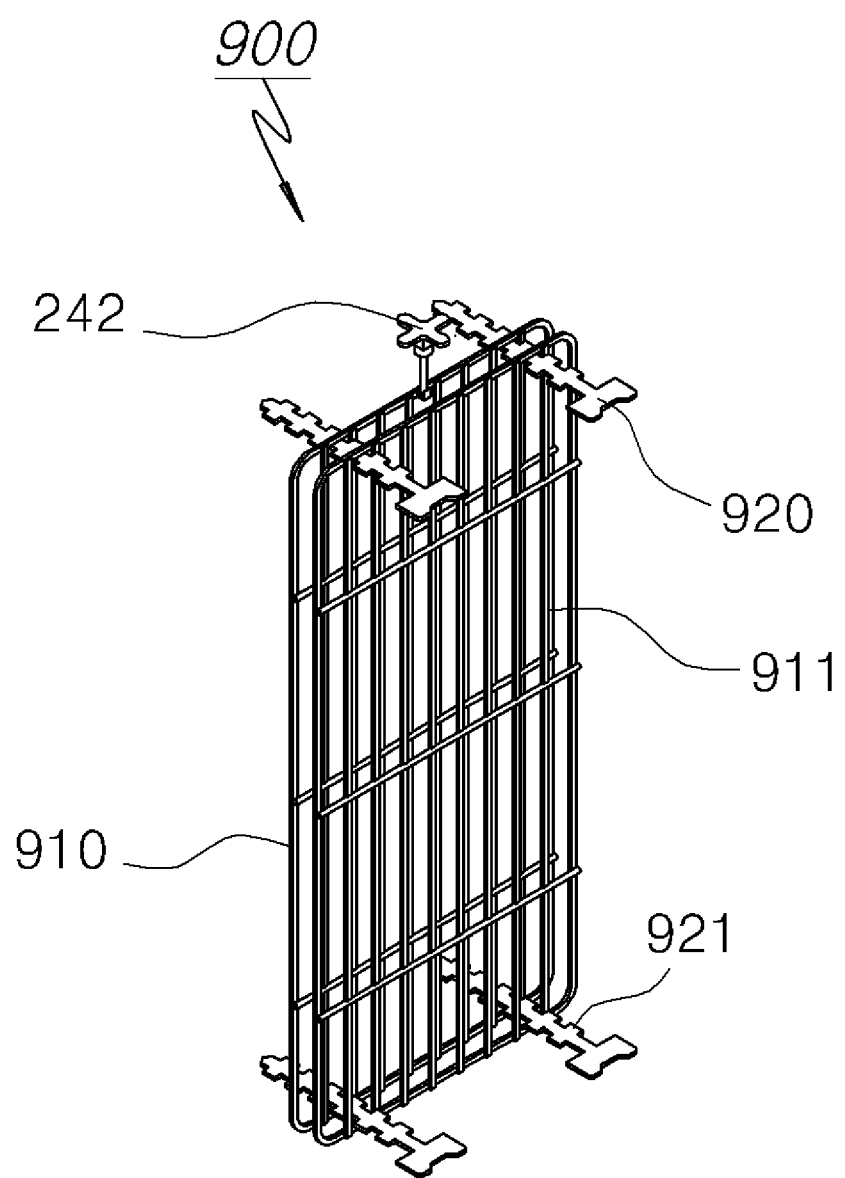
FIG. 16 is a view illustrating a food support unit used in the food roasting apparatus according to the present invention.

As shown in FIG. 16, the food support unit 900 includes a plurality of food supports 910 each of which has a rectangular frame and a plurality of metal rods 911 coupled to the rectangular frame. The food support unit 900 further includes a key-shaped locking holder 920 which is disposed in the food supports 910 and has a plurality of protrusions 921 which are releasably locked to the metal rods 911.

After food is interposed between the food supports 910 and force is applied to the food supports 910 such that the distance between the food supports 910 is reduced, the locking holder 920 is inserted into the food supports 910 in such a way that the protrusions 921 are not caught by the metal rods 910. Subsequently, the locking holder 920 is rotated so that the protrusions 921 are locked to the metal rods 910, thus holding the food supports 910.

As described above, in the food roasting apparatus according to the present invention, water stored in the water tank 300 is heated by the heating line 111 provided in the heating chamber housing 110, and steam generated from the water is used to cook food. Here, the generated steam reaches the food after passing through the medicinal substance container 600 that is installed in the heating chamber housing 110. Therefore, the taste and aroma of the medicinal substances contained in the medicinal substance container 600 permeate the food which is being cooked. As such, because the medicinal substance container 600 is disposed in the heating chamber housing 110, steam containing aroma of medicinal substances can be continuously supplied to food while cooking the food. Therefore, the present invention can avoid the conventional problem in which it is very inconvenient to open the heating chamber housing 110 and add medicinal substances into the heating chamber housing 110 while cooking.

Moreover, the food roasting apparatus of the present invention indirectly heats food or medicinal substances in a wet-heating fashion rather than directly heating them using a fire such as charcoal fire, thus preventing the medicinal substances from being burned while cooking.

Furthermore, because the food roasting apparatus is provided with the falling substance guide 400, food dregs or oil which falls downwards from the food while cooking can slowly flow into the water tank 300, thus preventing the food or the medicinal substances from being contaminated.

The invention claimed is:
1. A food roasting apparatus, comprising:
a main body having a heating chamber housing provided with a heating line;
a rotating unit provided in an upper end of the heating chamber housing, the rotating unit rotating a food to be cooked;
a water tank provided in lower end of the heating chamber housing and having a reverse conical shape with a water tank opening defined on an upper end thereof, the water tank opening having a first diameter, the water tank being configured to retain therein water that is used to wet-heat the food;
a falling substance guide coupled to the water tank, the falling substance guide having a conical shape with a first falling substance guide opening defined on a lower end thereof facing the water tank opening, the first falling substance guide opening having a second diameter smaller than the first diameter of the water tank opening, whereby oil falling from the food onto the falling substance guide flows into the water tank, the falling substance guide further having a second falling substance guide opening defined on an upper end thereof;
a steam control unit inducing evaporated moisture moving upwards through the upper end opening of the falling substance guide to circulate in the heating chamber housing by means of convection, the steam control unit including a support pipe disposed inside of the falling substance guide, and a forced convection means coupled to an upper end of the support pipe, the forced convection means having a funnel shape; and
a medicinal substance container disposed on the upper end opening of the falling substance guide, the medicinal substance container encircling the funnel-shaped forced convection means, the medicinal substance container containing a medicinal substance therein, the medicinal substance container having a mesh structure in its entirety;
wherein steam moving through the upper end opening of the falling substance guide is supplied into the heating chamber housing through the funnel-shaped convection means and the meshed medicinal support container; and
wherein an aroma of the medicinal substance permeates the food.
2. The food roasting apparatus of claim 1, wherein the forced convection means further comprises a cover coupled to an upper end of the forced convection means so as to allow medicinal herbs to be removably disposed in the forced convection means, the cover having a mesh structure.
3. The food roasting apparatus of claim 1, further comprising
a water exposure unit provided on a surface of the water stored in the water tank thereby exposing at least a portion of the surface of the water to air, the water exposure unit comprising:
a branch part radially extending from a central point of the water tank; and
water surface exposure pipes provided on the branch part at positions spaced apart from each other at regular intervals.
4. The food roasting apparatus of claim 3, wherein an external thread is formed on a lower end of the support pipe, and a through hole is formed in a central portion of the water exposure unit so that the support pipe is threaded into the through hole, wherein a height of the steam control unit is adjusted by rotating the support pipe thereby adjusting a rate at which the steam containing the aroma of the medicinal ingredients is supplied into the heating chamber housing is adjusted.

5. The food roasting apparatus of claim 1, further comprising
an immersion unit installed in the water tank such that the immersion unit is immersed in the water in the water tank, the immersion unit being provided to enhance intensity of the aroma of the medicinal substance or make different kinds of aromas permeate the food.

6. The food roasting apparatus of claim 5, wherein the immersion unit comprises:
a barley stone having a conical shape and emitting far-infrared rays; and
an immersed medicinal substance container provided on a branch part radially extending from the barley stone, the immersed medicinal substance container having a mesh structure.

7. The food roasting apparatus of claim 1, further comprising
a convection fan provided in the upper of the heating chamber housing to make convectional circulation of evaporated moisture and the aroma of the medicinal substance smoother.

8. The food roasting apparatus of claim 1, further comprising
a nozzle installed in the heating chamber housing, the nozzle spraying water to remove a foreign substance that remains in the heating chamber housing after the heating chamber housing has been used.

9. The food roasting apparatus of claim 1, further comprising a smoking chip storage unit installed in a side surface of the heating chamber housing,
wherein the smoking chip storage unit comprises:
a hexahedral body configured to be open on an upper end and a side surface that faces an interior of the heating chamber housing;
a mesh net covering the side surface of the hexahedral body that faces the interior of the heating chamber housing such that smoke is supplied into the heating chamber housing through the mesh net; and
an upper cover coupled to the hexahedral body in a sliding manner so as to openably cover the open upper end of the hexahedral body, the upper cover allowing smoking chips to be supplied into or removed from the hexahedral body through the open upper end of the hexahedral body.

10. The food roasting apparatus of claim 9, wherein the smoking chip storage unit further comprises:
a smoke pipe connecting the smoking chip storage unit to the support pipe; and
a smoke fan supplying smoke generated from the smoking chips into the heating chamber housing through the smoke pipe.

11. The food roasting apparatus of claim 1, wherein the rotating unit comprises an upper ring and a lower ring that are provided parallel to each other,
wherein the upper ring is fixed to the heating chamber housing so as not to be rotatable, a rotating shaft is disposed in a central portion of the upper ring, and the lower ring is coupled to a lower end of the rotating shaft such that the lower ring is rotated.

12. The food roasting apparatus of claim 11, wherein the rotating unit further comprises:
a bracket rotator protruding from the upper ring towards the lowing ring; and
a plurality of brackets arranged on the lower ring along a circumference of the lower ring, at least one bracket of the plurality of brackets being configured such that a food support unit is coupled to the at least one bracket of the plurality of brackets;
wherein the at least one bracket of the plurality of brackets comprises an upper bracket disposed above the lower ring, a lower bracket disposed below the lower ring, a bracket rotating shaft connecting the upper bracket to the lower bracket, thereby rotating the upper and lower brackets and in conjunction with each other, and a rotation limiter provided between the upper bracket and the lower ring, and
wherein the at least one bracket of the plurality of brackets is caught and rotated by the bracket rotation limiter.

13. The food roasting apparatus of claim 12, wherein the rotation limiter comprises:
a rotational block coupled to the bracket rotating shaft, the rotational block having a rounded rectangular cross-section; and
an elastic plate coming into close contact with a planar surface of the rotational block, thereby interrupting rotation of the rotational block.

14. The food roasting apparatus of claim 12, wherein the food support unit comprises:
a plurality of food supports each of which comprises a rectangular frame and a plurality of metal rods connected to the rectangular frame; and
a key-shaped locking holder disposed in the food supports and having a plurality of protrusions releasably locked to the metal rods,
wherein the food is interposed between the food supports and is clamped between the food supports by the locking holder.

15. The food roasting apparatus of claim 1, further comprising
a charcoal bucket coupled to the rotating unit the charcoal bucket having a mesh structure and storing charcoal therein so that aroma of the charcoal permeate the food.

* * * * *